United States Patent [19]
Sprenger

[11] 3,830,136
[45] Aug. 20, 1974

[54] CURVED SURFACE ENGRAVER

[75] Inventor: Edwin Sprenger, Ascona, Switzerland

[73] Assignee: New Hermes Company, New York, N.Y.

[22] Filed: July 23, 1973

[21] Appl. No.: 381,967

[52] U.S. Cl.......................... 90/13.1, 90/13.6, 33/22
[51] Int. Cl............................................... B23c 1/18
[58] Field of Search.................. 90/13.1, 13.3, 13.6; 33/22

[56] References Cited
UNITED STATES PATENTS

| 486,210 | 11/1892 | Hope | 33/22 |
| 1,874,046 | 8/1932 | Jonsson | 33/22 |
| 3,587,388 | 6/1971 | Muehlenweb | 33/22 X |

*Primary Examiner*—Gil Weidenfeld
*Attorney, Agent, or Firm*—Seidel, Gonda & Goldhammer

[57] ABSTRACT

A machine for engraving surfaces which may be cylindrical, tapered or curved from a pattern which lies in a flat plane. The machine includes pattern following means and an engraving tool connected thereto by a mechanism which causes the movement of the pattern following means in the plane of the pattern to be reproduced by the engraving tool on the surface. Means are provided for always maintaining the engraving tool perpendicular to the surface which is being engraved.

15 Claims, 6 Drawing Figures

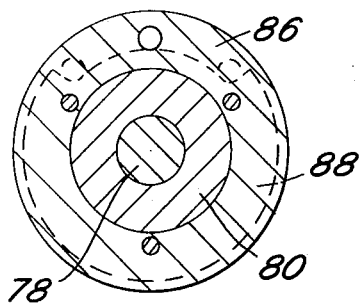
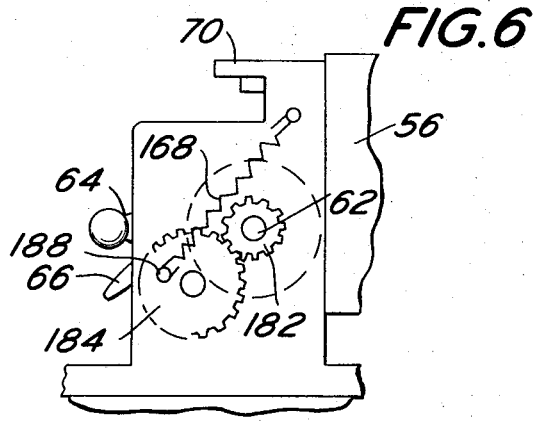
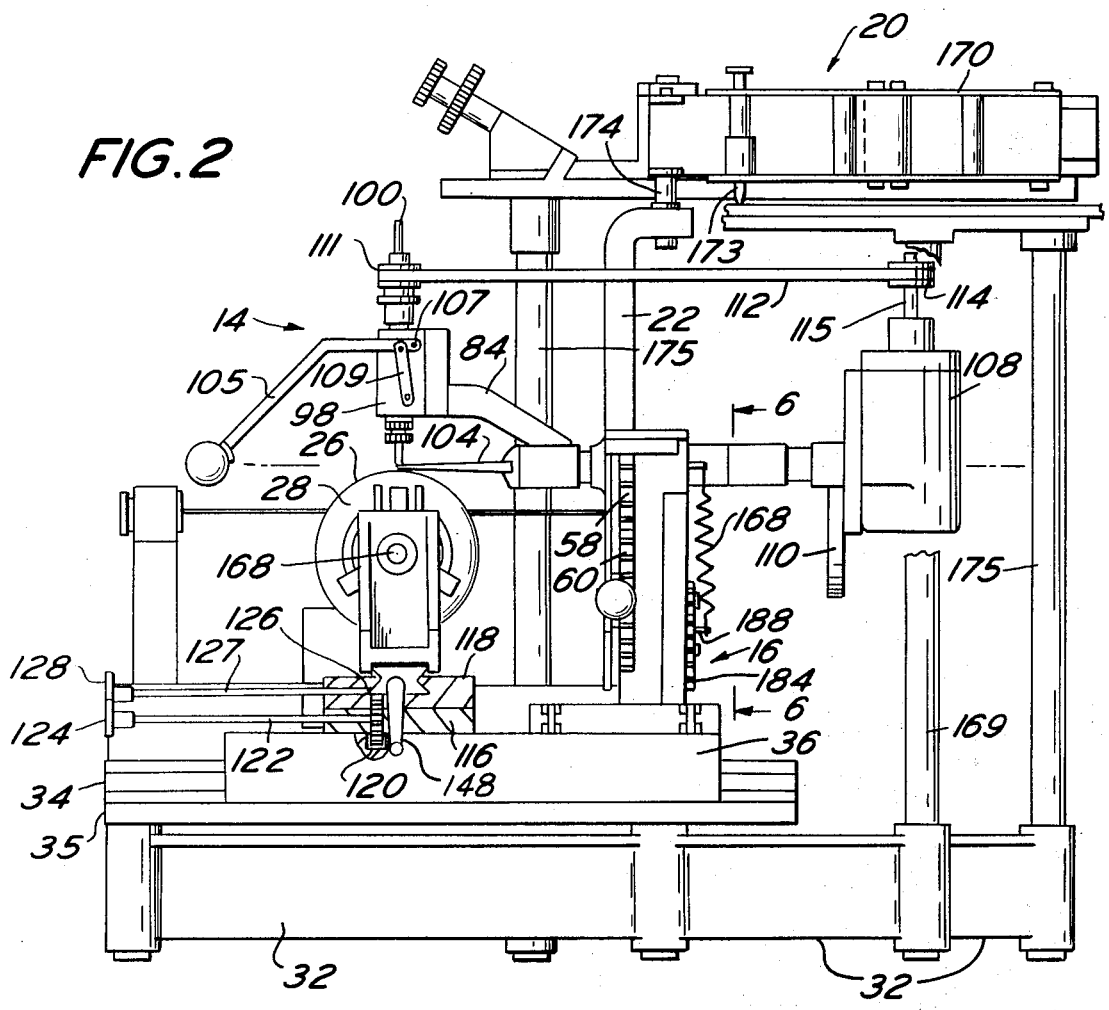

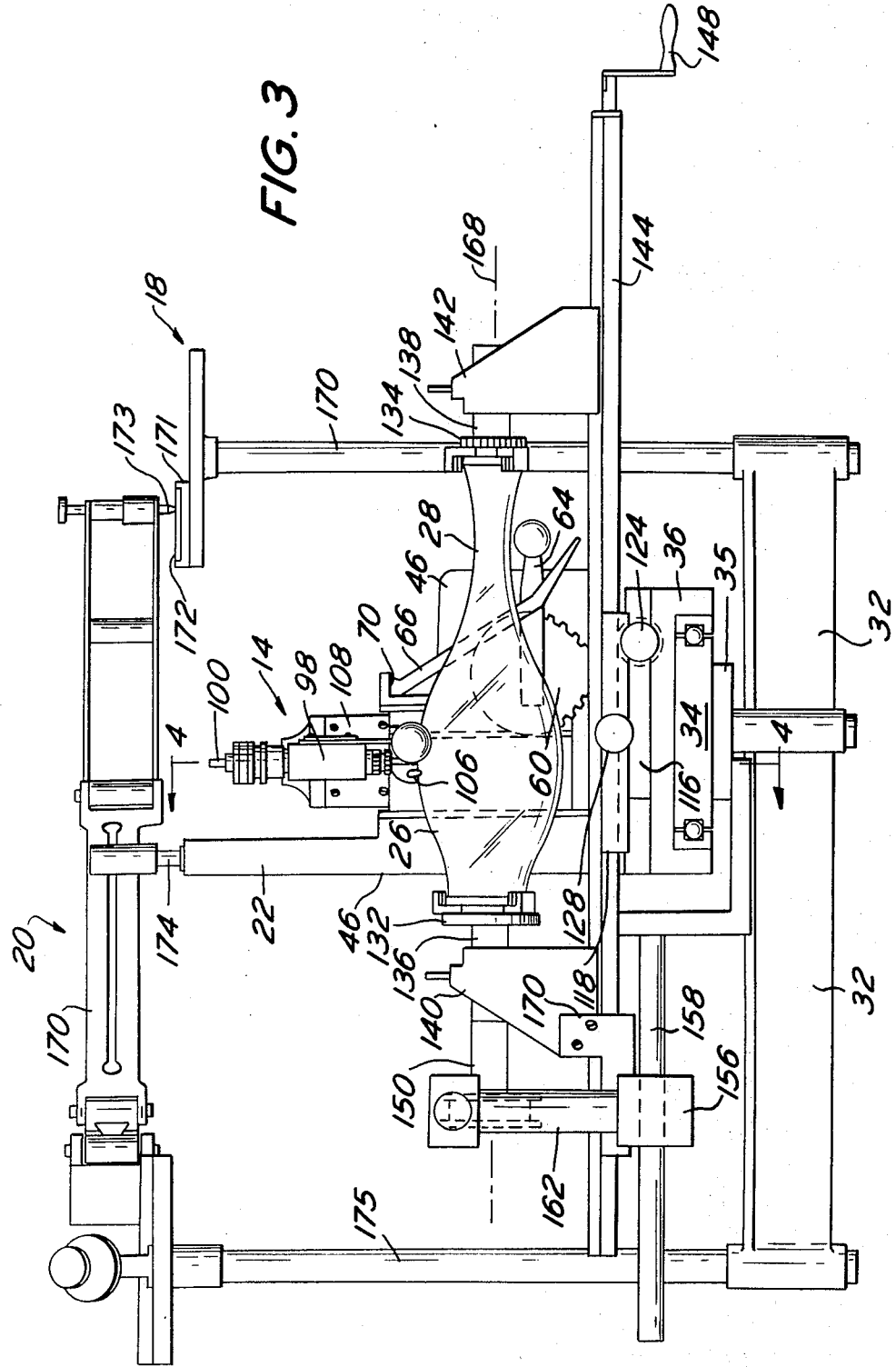

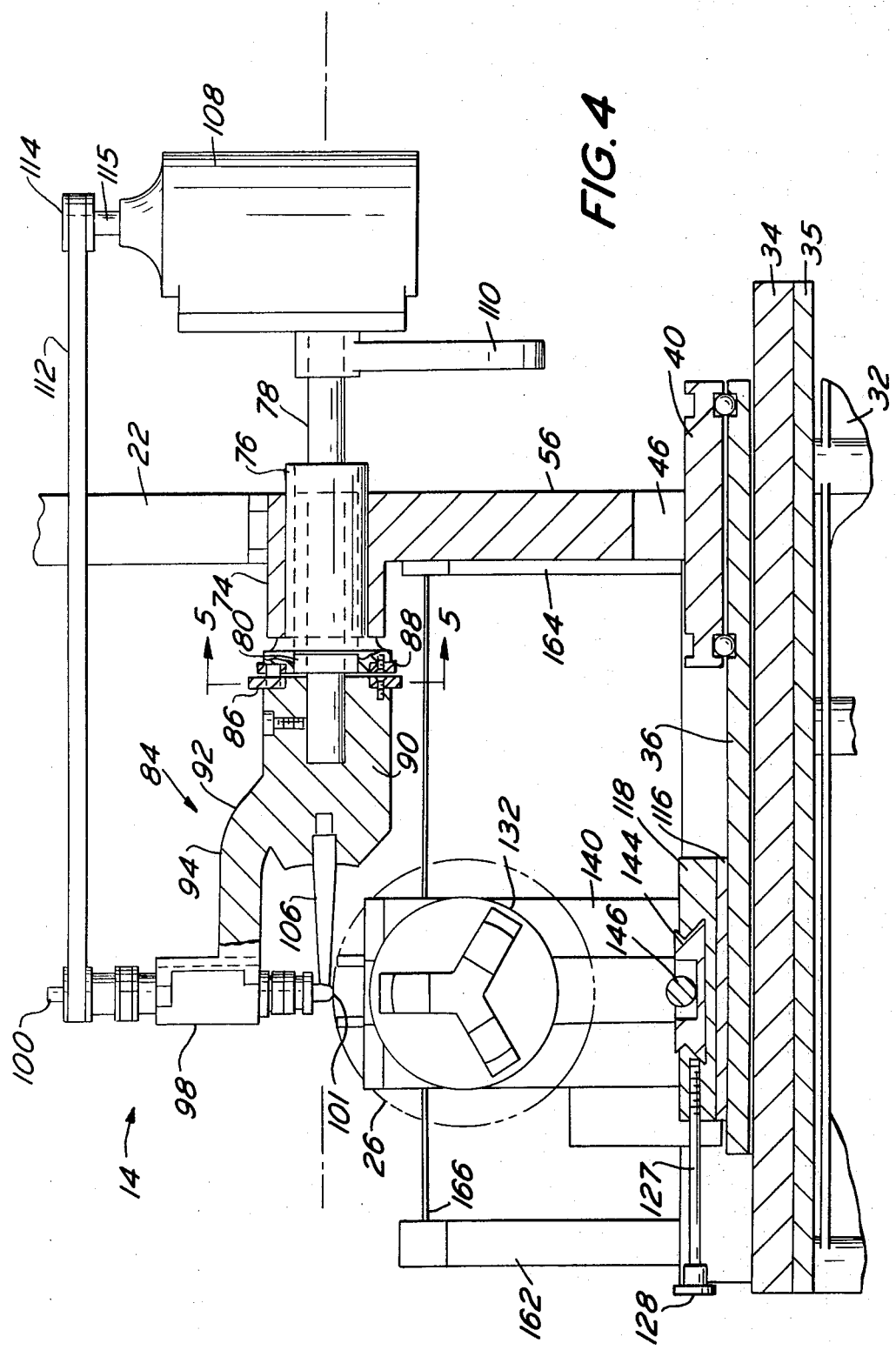

CURVED SURFACE ENGRAVER

This invention relates to engraving machines and more particularly to machines which can engrave surfaces which may be cylindrical, tapered or curved by following patterns which lie in a flat plane.

Cutting tools for engraving glass surfaces and the like are hollow cylindrical members. The cutting teeth are formed on the cylinder walls, and the diameter of the tool corresponds to the width of the line to be engraved. Unless the tool is perpendicular to the surface being engraved so that the cutting face is squarely in engagement therewith, the engraved lines will be distorted.

A similar problem arises when metal such as brass, silver or gold are engraved. Thus, the cutting tools used to engrave these materials must be perpendicular to the surface being engraved to avoid distortion. Typically, the cutting face for these tools comprise pointed diamonds. The diamonds may be either conically shaped or faceted.

The cutting tools for glass and metals are supported in the engraving machine in suitable tool holders. The glass cutter rotates during engraving. The metal cutter may rotate during engraving, depending on the shape of the tool and the particular material and pattern being cut.

It would be desirable to have a machine which can engrave cylindrical, tapered or curved surfaces by following a pattern which lies in a flat plane. Thus, such a machine would have means thereon for maintaining the engraving tool perpendicular to the surface to be engraved without regard for its configuration.

Furthermore, the fact that engraving could be accomplished from a pattern lying in a flat plane would enable existing pantograph devices to be employed. Thus, it would not be necessary to create special patterns which would follow te configuration of the surface to be engraved.

Accordingly, the invention generally relates to an apparatus for engraving a surface comprising a frame and an engraving tool. The apparatus comprises a first means which couples the engraving tool to the frame for movement in first and second mutually perpendicular paths relative to the frame. Additional means for following a pattern to be engraved are provided. The following means is movable in mutually perpendicular paths and is coupled to the first means so that movement of the following means moves the engraving tool along said first and second paths.

Second means are provided for supporting an article having a surface to be engraved. The second means is mounted on the first means for movement therewith. Third means is provided for coupling the second means to the frame so that movement of the following means is operative to cause the pattern to be engraved on the surface.

For the purpose of illustrating the invention, one presently preferred embodiment is shown in the drawings; it being understood, however, that this invention is not limited to the precise arrangements and instrumentalities shown and wherein:

FIG. 2 is a front elevation view of the apparatus illustrated in FIG. 1.

FIG. 3 is a side elevation view of the apparatus illustrated in FIG. 1.

FIG. 4 is a sectional view taken along line 4—4 of FIG. 3.

FIG. 5 is a sectional view taken along line 5—5 of FIG. 4.

FIG. 6 is a sectional view taken along line 6—6 of FIG. 2.

Figure 1:
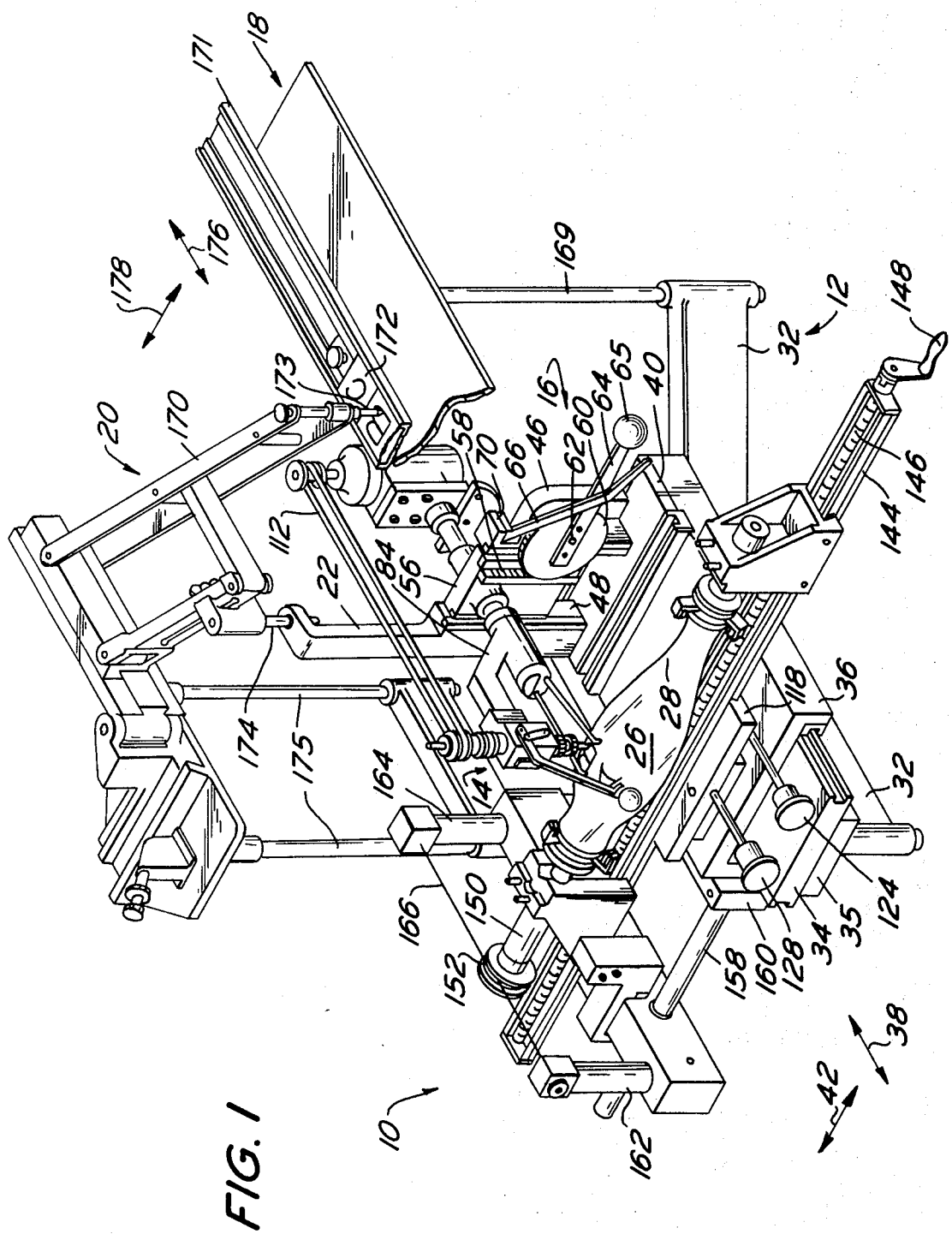
FIG. 1 is a perspective view of an apparatus constructed in accordance with the invention.

Now referring to the drawings for a detailed description of the apparatus, an engraving apparatus 10 is illustrated in FIG. 1. It comprises a base frame 12, engraving tool 14, means for coupling the engraving tool to the frame 16, a pattern support 18 for supporting a pattern in a flat plane and means 20 for following a pattern on the pattern support. The following means 20 is connected to the coupling means 16 by a suitable element 22.

The pattern supported in a flat plane on the pattern support 18 is engraved on the curved surface 26 of the article 28 supported by the apparatus.

The base frame 12 may comprise a plurality of legs 32 which may rest on a suitable support such as a table or the like. A guide plate 34 which is an elongated rectangular member is supported on the base frame by being connected to plate 35 which in turn is supported on the base frame 12.

The means 16 for coupling the engraving tool to the frame comprises a slide plate 36 which is an elongated rectangular member. Slide plate 36 is mounted on guide plate 34 for movement along a first path which is indicated by the arrow 38.

The coupling means 16 also includes a second slide plate 40. The second slide plate 40 is mounted on slide plate 36 for movement along a second path indicated by arrow 42. First and second paths 38 and 42 are mutually perpendicular to each other so that an object supported thereon may be moved to any desired location with respect to the base frame 12. The second slide plate can be constrained by raised bearing tracks on the surface of slide plate 36 or by any other suitable means. Further, it should be noted that the paths of movement of the two slide plates could be reversed without departing from the scope or spirit of the invention.

An upright element 46 is supported on the upper surface of slide plate 40 for movement therewith. The upright element has an upwardly facing elongated central opening 48. A block 56 which is constrained in the central opening 48 for vertical movement relative to the surface of slide plate 40 supports the engraving tool for vertical movement and for rotation in a manner which will be described in greater detail herein.

The block may be moved vertically in a number of convenient ways. However, a presently preferred apparatus comprises a rack and pinion arrangement wherein the rack 58 is fixed to block 56 while the pinion 60 is secured to upright element 46 by a pin 62 and is rotated about that pin by a lever 64. A knob 65 may be positioned at the end of lever 64.

The block 56 may be constrained in its full raised position by a suitable detent. Preferably, the detent comprises a second lever 66 (FIG. 3) which is connected at an intermediate portion thereof to an intermediate portion of lever 64 by pin 68. One end of lever 66 is adapted to rest beneath an outwardly extending ledge 70 on the upright element 46 when the block 56 is in its full raised position. This is because lever 66 prevents lever 64 from rotating counterclockwise (FIG. 3) to lower block 56.

The second lever may be disengaged by merely raising block 56 above the position indicated and rotating the second lever out from under ledge 70.

As best seen in FIG. 4, the block 56 includes a boss 74 having a hollow interior. A bearing support 76 having a hollow interior is mounted within the boss rotatably supports an elongated shaft 78 by first and second bearings 80 so that the shaft can rotate about its own longitudinal axis. It should be noted that the longitudinal axis of shaft 78 is parallel to the first path of movement 38.

A generally goose-neck shaped arm 84 is fixed to the end of shaft 78 for rotation therewith. The arm 84 may be connected to the shaft by a set screw or by any other convenient means.

The facing surfaces between bearing support 76 and arm 84 are provided with circular bearings 86 and 88 to permit the shaft and goose-neck shaped arm 84 to rotate without binding on the face of the bearing support as best seen in FIG. 5.

The goose-neck shaped arm 84 has a first forwardly extending portion 90, an upwardly and forwardly extending portion 92 and a second forwardly extending portion 94. An engraving tool holder 98 is supported at the end of the second forward portion 94. The engraving tool 100 is supported in the engraving tool holder so that its cutting face 101 lies along the longitudinal axis of shaft 78 between first and second guide arms 104 and 106. The guide arms are supported by the goose-neck shaped arm 84.

The engraving tool holder 98 is well known in the art. It comprises a chuck in which the engraving tool 100 is received. The chuck can be raised and lowered inside the tool holder by pivoting lever 105 about pin 107. Lever 105 is connected to link 109 which in turn is connected to the chuck. The chuck has a sheave 111 so that it can be driven.

A motor 108 and counterweight 110 are supported at the opposite end of shaft 78. The motor is connected to engraving tool holder 98 by virtue of an elongated flexible member such as a belt 112 which engages sheave 111 on the chuck and sheave 114 on the motor drive shaft 115.

Slide plate 36 supports first and second adjustment plates 116 and 118. Both plates 116, 118 are fixed to each other and to slide plate 36 for movement with plate 36. Plate 116 which is fixed to slide plate 36 has gear 120 supported in a recess therein at the end of shaft 122. A knob 124 at the free end of shaft 122 enables the gear 120 to be turned.

Plate 118 has an elongated recess 126 which is disposed in parallel relation to direction of travel indicated by arrow 42. Recess 126 may be dovetailed for a reason which will be explained herein. The plate 118 has an opening through which a portion of gear 120 may extend into recess 126.

A threaded shaft 127 having a knob 128 is threadingly received in plate 118.

The article whose surface 26 is to be engraved is mounted between the jaws of scroll chucks 132 and 134. The chucks comprise mandrels 136 and 138 which are rotatably mounted on jaws 140 and 142.

The jaws 140 and 142 are slidably mounted on an elongated member 144 which is received in plate 118. Elongated member 144 is dovetailed so that it is constrained for sliding movement along path 42. Member 144 has a rack on its lower surface that is engaged with gear 120 so that its displacement relative to plate 118 can be easily achieved. Knob 128 and shaft 127 lock member 144 in any desired position.

As best seen in FIGS. 1, 3 and 4 the jaws 140, 142 are mounted in facing relation to each other on member 144. Member 144 is provided with an elongated threaded shaft 146 which may be rotated by a crank handle 148. The jaws 140 and 142 are engaged by the threads in shaft 146 so that actuation of the handle 148 moves the jaws toward and away from each other on member 144.

Mandrel 136 has an extension 150 which supports a sheave 152. The extension and sheave are fixed to mandrel 136 so that rotation of the sheave causes the mandrel and an article supported between the chuck jaws to rotate.

An elongated rectangular bar 156 (FIGS. 1 and 3) is slidably supported on rods 158. The rods 158 are connected to the frame in spaced parallel relation to each other by a bracket 160 which is fixed to the plates 34 and 35.

Upwardly extending members 162 and 164 are supported at each end of bar 156. The members 162 and 164 support the ends of an elongated flexible member which may be a wire 166. The wire is turned around sheave 152. Jaw 140 is connected to bar 156 by bracket 170 so that the wire 166 always stays in the plane of the sheave 152 as jaw 140 is moved along elongated member 144.

Significantly, it should be noted with respect to FIGS. 2 and 4 that the engraving tool 100 lies along a radius extending from the axis of rotation 168 of the scroll chucks. Furthermore, both the engraving tool and the scroll chucks are supported for movement on slide plate 36. Thus, as slide plate 36 is displaced along guide 34 in the direction of arrow 38, the engraving tool always remains over axis 168. However, because of the relationship between sheave 152 and elongated flexible member 166, mandrel 136 and the article to be engraved 28 is rotated so that a different portion of the surface thereof is beneath the engraving tool as the slide plate 36 is moved.

It is to be appreciated that by varying the diameter of the sheave 152 the degree of rotation of the chucks for a given movement of slide 36 can be varied. Further, the rotation of the chucks can be achieved by means other than that shown. For example, wire 166 and sheave 152 could be replaced by a rack and pinion gear respectively.

The pattern supporting means 18 lies in a flat plane over the article to be engraved. As illustrated it may be supported by one or more arms 169 which are connected to the base frame 12. A bracket 171 on the pattern support 18 carries the pattern to be engraved. The pattern may typically comprise letters 172.

The following means 20 may comprise a pantograph device 170 which includes a follower element 173 so that the movements of the follower element 173 are transmitted to upright element 46 by way of coupling element 22 and pin 174. The pantograph device 170 is supported by arms 175 above the engraving apparatus.

The pantograph device illustrated herein is well known in the art and need not be described in detail. However, as indicated above the pantograph device and the pattern support are carried by the base frame 12 in overlying relation to the article to be engraved.

However, this arrangement is not critical since any convenient form of coupling between the pantograph device 170 and the upright element 46 could be employed.

As is well known, the movement of the follower element 173 in the plane of pattern support 18 can be resolved into two components. These components are useful in transferring the movement of the follower element to slide plates 36 and 40. One of the components may be identified as a third path which is defined by arrow 176. The other component is identified as a fourth path which is defined by arrow 178. Both the third and four paths 176 and 178 are mutually perpendicular to each other and correspond to the first and second paths 38 and 42 respectively.

Thus, movement of the follower element 173 along third path 178, causes slide plates 36 and 40 to move along first path 38. Movement of follower element 173 along fourth path 178 causes slide plate 40 to move along second path 42 relative to slide plate 36.

In order to engrave a surface 26, the desired pattern 172 is placed within bracket 171 on pattern support 18. Because the pattern support is flat, it is not necessary to use specially prepared pattern pieces as those which have been used for conventional engraving on flat surfaces may be employed.

The article to be engraved 28 is positioned within the jaws of scroll chucks 132 and 134. The jaws are then clamped on the article by rotating crank handle 148.

Knob 124 is rotated to move elongated member 144 and the article longitudinally so that the portion of the surface to be engraved is under the engraving tool. Knob 128 is rotated to lock elongated member 144 against further movement.

The engraving tool is then lowered by counterclockwise rotation of lever 105 (FIG. 2) until its cutting face engages surface 26. The weight of the tool, shaft 78, motor 108 and counter-weight 110 are balanced by the mechanism illustrated in FIG. 6 so that the engraving tool responds readily when moved up and down.

This mechanism comprises a relatively small gear 182 (FIG. 6) which is fixed to pin 62 for rotation as lever 64 rotates. Gear 182 meshes with a larger gear 184 which is pinned to upright 46. A spring 168 is coupled between the upright 46 and an eccentrically located pin 188 on the face of gear 184. Thus, as block 56 tends to move toward the bottom of opening 48, gear 182 rotates clockwise. This results in a counterclockwise rotation of gear 184 and an extension of spring 168. Thus, the spring is used to balance the block 56 and the members associated therewith.

Guide arms 104 and 106 bear against the surface to be engraved on each side of the engraving tool to maintain it perpendicular thereto.

Motor 108 is energized and the follower element 173 is moved through the pattern.

When the follower element 173 moves along the third path 176, as, for example, by tracing the horizontal portions of the letter "B" the article 28 rotates about axis 168 thereby permitting the tool to engrave corresponding parts of the letter on surface 26.

This is accomplished because the coupling element 22 causes slide plate 36 to move along the first path 38. However, because sheave 152 is engaged by flexible member 166, the sheave and article coupled thereto are caused to rotate.

On the other hand, when the following element 173 moves along the fourth path 178 as, for example, when by tracing the vertical part of the letter "B" the coupling element 22 causes the slide plate 40 to move along the second path 42 thereby translating the engraving tool along axis 168.

It is apparent that the entire pattern 172 which is to be reproduced can be covered by combination of movements corresponding to those in the third and fourth paths 176 and 178.

These movements are translated by the apparatus disclosed herein to rotary movement of the article to be engraved under the engraving tool and translation of the engraving tool relative to the article.

It should be noted that the guide arms 104 and 106 and the cutting face of the engraving tool define a plane so that the engraving tool is always perpendicular to the surface which is to be engraved. Thus, uniform engraving of high quality may be achieved herein.

It should be noted that the pattern support and pantograph device 170 been shown positioned so that the first path 38 and third path 176 are parallel, and the second path 42 and fourth path 178 are also parallel. This results in a simple arrangement for coupling the pantograph device 170 to the engraving tool. However, the pantograph device 170 and pattern to be traced thereby can be in any convenient position with respect to the engraving tool providing a suitable linkage is provided for transferring movements along the third and fourth paths of the follower element to corresponding movements along the first and second paths of the slide plates 36 and 40 is employed.

While the invention has been described with reference to a particular embodiment thereof, it should be apparent that many other forms and embodiments of the invention would be obvious to persons skilled in the art. Accordingly, the scope of the invention should not be limited by the foregoing description, but rather, only by the scope of the claims appended hereto.

I claim:

1. An apparatus for engraving a surface comprising a frame, an engraving tool, first means coupling said engraving tool to said frame for movement in first and second mutually perpendicular paths relative to said frame, means for following a pattern to be engraved, said following means being constrained for movement in a flat plane with its movement being resolvable into third and fourth mutually perpendicular paths, means coupling said following means to said first means so that movement of said following means along its third and fourth paths moves said engraving tool relative to said frame in its first and second paths respectively, second means for supporting an article having a surface to be engraved, said second means being mounted on said first means for movement along said first path, third means for coupling said second means to said frame, said third means being for moving the surface past said engraving tool along said first path in response to movement of said following means along its third path to enable said engraving tool to engrave the surface in the direction of said first path, and said first means moving said engraving tool along the surface in the direction of said second path in response to movement of said following means along its fourth path.

2. An apparatus as defined in claim 1 wherein said first means comprises a first member mounted on said frame for movement along one of said paths of movement of said first means, a second member mounted on said first member for movement along the other path of movement of said first means, and said engraving tool is coupled to said second member.

3. An apparatus as defined in claim 1 wherein said first and third paths are parallel, and said second and fourth paths are parallel.

4. An apparatus as defined in claim 2 wherein said first means rotatably supports an elongated member, said engraving tool being fixed to said member for rotation therewith about a first axis which is parallel to said first path, guide means supported by said engraving tool for maintaining said engraving tool perpendicular to the surface to be engraved, and means on said elongated member for driving said engraving tool.

5. An apparatus as defined in claim 1 wherein said first mean includes means enabling said engraving tool to rotate about a first axis which is parallel to said first path, and guide means supported by said first means, said guide means being operative to support said engraving tool in perpendicular relation to the surface being engraved.

6. An apparatus as defined in claim 5 wherein said guide means comprise an arm disposed on each side of said engraving tool.

7. An apparatus as defined in claim 1 wherein said second means comprises means for supporting an article having a curved surface to be engraved, said second means supporting the article so that the surface is rotatable about a first axis which is parallel to said second path of movement of said means, and said third means comprises a circular element coupled to said article supporting means and other means fixed to said frame and engageable with said circular element so that movement of said second means relative to said frame along said first path causes said circular element to rotate said surface past said engraving tool.

8. An apparatus as defined in claim 7 wherein said circular member is a sheave and said other member is an elongated flexible element fixed to said frame at its ends and having its intermediate portion wrapped around said sheave so that when said second means moves along said first path, said sheave and said elongated flexible member rotate said article support.

9. An apparatus as defined in claim 1 wherein said third means comprises means for rotating the surface to be engraved about an axis when said following means moves along one of its paths so that a curved surface can be engraved.

10. An apparatus as defined in claim 9 wherein said first means includes means enabling said engraving tool to rotate about a first axis which is parallel to said first path, and guide means supported by said first means, said guide means and the cutting face of said engraving tool defining a plane which is perpendicular to the engraving tool so that when said guide means is on the surface to be engraved, the engraving tool is maintained in perpendicular relation thereto.

11. Apparatus for engraving a surface which is curved about a longitudinal axis comprising a frame, said frame supporting a pattern to be engraved on said curved surface, a first member slidably mounted on said frame for sliding movement along a first path relative thereto, a second member slidably mounted on said first member for sliding movement along a second path which is perpendicular to said first path, first means on said first member for rotatably supporting the surface to be engraved so that its longitudinal axis is parallel to said second path, a pantograph mounted on said frame, said pantograph including means for following a pattern to be engraved, said pantograph being coupled to said second member so that movement of said following means in a third path causes said first and second means to move along said first path, and movement of said following means in a fourth path causes said second means to move along said second path, and an engraving tool pivotally coupled to said second member for movement about an axis which is parallel to said first path of movement and being coupled to said second member for movement therewith, guide means coupled to said engraving tool for maintaining it in perpendicular relation to the surface to be engraved, second means for driving an engraving tool, and third means coupled to said surface supporting means and said frame for rotating said surface about its longitudinal axis as said first member is moved along said first path.

12. Apparatus as defined in claim 11 wherein said third means comprises a circular element coupled to said first means, and other means fixed to said frame and engageable with said circular element so that displacement of said first member relative to said frame causes said circular element to rotate said surface past the engraving tool.

13. Apparatus as defined in claim 11 wherein said second member comprises means for displacing said engraving tool toward and away from the longitudinal axis of the surface to be engraved.

14. Apparatus for engraving a surface which is curved about a longitudinal axis comprising, a frame, first means on said frame for supporting an article to be engraved for rotation about its longitudinal xis and for translation along said frame in a path perpendicular to said longitudinal axis, an engraving tool, second means coupled to said first means, said second means supporting said engraving tool along a radius from said longitudinal axis and so that it is rotatable about a second axis which is perpendicular to to said longitudinal axis, the intersection of said radius and said second axis defining the location of the cutting face of the engraving tool, said second means supporting said engraving tool holder for movement relative to said frame along said longitudinal axis, guide means coupled to said engraving tool for maintaining it in perpendicular relation to the surface to be engraved, means for following a pattern to be engraved, and means for rotating said surface about said longitudinal axis past said location in response to movement of said following means in a direction which corresponds to the direction of said path.

15. Apparatus as defined in claim 13 wherein said frame supports a pattern disposed in a flat plane, and said first and second means cooperate with said guide means to enable said pattern to be engraved on the curved surface.

* * * * *